(12) United States Patent
Bastard et al.

(10) Patent No.: US 7,341,686 B2
(45) Date of Patent: Mar. 11, 2008

(54) DEVICE FOR ARRESTING THE PROPAGATION OF A BUCKLE IN A DOUBLE-WALLED PIPE

(75) Inventors: Antoine Bastard, Thiberville (FR); Gordon Tough, Aberdeen (GB)

(73) Assignee: Technip France (FR)

( * ) Notice: Subject to any disclaimer, the term of this patent is extended or adjusted under 35 U.S.C. 154(b) by 0 days.

(21) Appl. No.: 11/252,639

(22) Filed: Oct. 18, 2005

(65) Prior Publication Data
US 2006/0032036 A1     Feb. 16, 2006

Related U.S. Application Data

(63) Continuation of application No. 09/598,010, filed on Jun. 20, 2000, now abandoned.

(30) Foreign Application Priority Data

Jul. 2, 1999     (FR) .................................. 99 08539
Dec. 2, 1999     (FR) .................................. 99 15216

(51) Int. Cl.
  *B32B 43/00*     (2006.01)
  *B29D 24/00*     (2006.01)
(52) U.S. Cl. ................ 264/262; 264/319; 405/155; 405/156
(58) Field of Classification Search ............ 264/262, 264/269, 319, 36.17, 564; 138/97, 115, 149, 138/37; 405/169, 155, 156
See application file for complete search history.

(56) References Cited

U.S. PATENT DOCUMENTS

| 2,425,800 A | 8/1947 | Hamilton ..................... 153/32 |
| 3,747,356 A | 7/1973 | Lochridge et al. ........... 61/72.3 |
| 3,768,269 A | 10/1973 | Broussard et al. ........... 61/72.3 |
| 3,860,039 A | 1/1975 | Ells ............................. 138/103 |

(Continued)

FOREIGN PATENT DOCUMENTS

BE     901 034     5/1985

(Continued)

OTHER PUBLICATIONS

"Recommended Practice for Design and Operation of Subsea Production System," *American Petroleum Institute*, API Specification 17A, First Edition: Sep. 1, 1987, pp. 1-86.

*Primary Examiner*—Philip Tucker
*Assistant Examiner*—Sing P. Chan
(74) *Attorney, Agent, or Firm*—Ostrolenk, Faber, Gerb & Soffen, LLP

(57) ABSTRACT

Device for arresting the propagation of a buckle in a double walled pipe.

The device comprising an outer pipe wall having a defined external diameter and placed around an inner pipe wall, defining an annular space between the said outer and inner walls; providing predetermined regions in the annular space which are bounded between two sealing blocks with radially opposed faces which are in contact with the outer and inner pipes; placing a curable compound in each region and curing it the length of each region is at least equal to 0.5 times the external diameter of the outer wall.

21 Claims, 3 Drawing Sheets

U.S. PATENT DOCUMENTS

| | | | |
|---|---|---|---|
| 4,176,691 A | 12/1979 | Jude et al. | 138/103 |
| 4,364,692 A | 12/1982 | Kyriakides et al. | 405/168 |
| 4,377,547 A | 3/1983 | Hervig | 264/262 |
| 4,522,578 A | 6/1985 | Martin et al. | 425/110 |
| 4,786,088 A | 11/1988 | Ziu | 285/123.1 |
| 4,837,271 A * | 6/1989 | Brindopke | 525/330.3 |
| 4,954,152 A | 9/1990 | Hsu et al. | 65/392 |
| 5,368,670 A | 11/1994 | Kauffman | 156/171 |
| 5,382,793 A | 1/1995 | Weinberger et al. | 250/288 |
| 5,402,831 A | 4/1995 | Hollis | 138/113 |
| 5,447,179 A | 9/1995 | Gibbs et al. | 138/143 |
| 5,474,721 A | 12/1995 | Stevens | 264/45.3 |
| 5,711,072 A | 1/1998 | Nakamura | 29/895.32 |
| 5,804,767 A | 9/1998 | Winfield et al. | 174/74 R |
| 5,860,453 A | 1/1999 | Picking | 138/112 |
| 5,900,585 A | 5/1999 | Winfield et al. | 174/74 R |
| 6,058,979 A | 5/2000 | Watkins | 138/149 |
| 6,402,201 B1 | 6/2002 | Pool et al. | 285/47 |
| 6,440,347 B1 | 8/2002 | Izawa et al. | 264/262 |

FOREIGN PATENT DOCUMENTS

| | | |
|---|---|---|
| DE | 32 08 452 | 1/1983 |
| DE | 196 04 147 | 8/1997 |
| FR | 2 015 293 | 4/1970 |
| GB | 2268564 A * | 1/1994 |
| WO | WO 96/17940 | 6/1996 |
| WO | WO 96/36831 | 11/1996 |

* cited by examiner

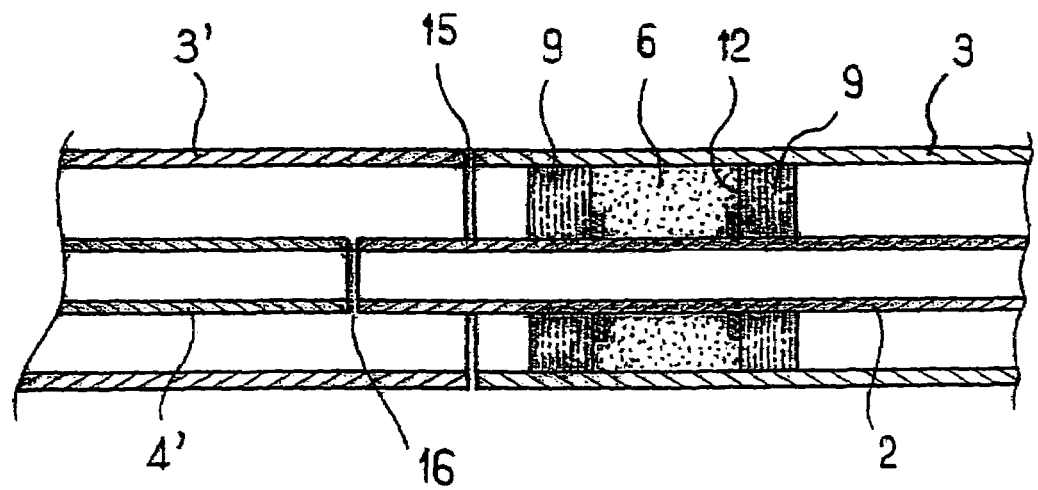
FIG_2
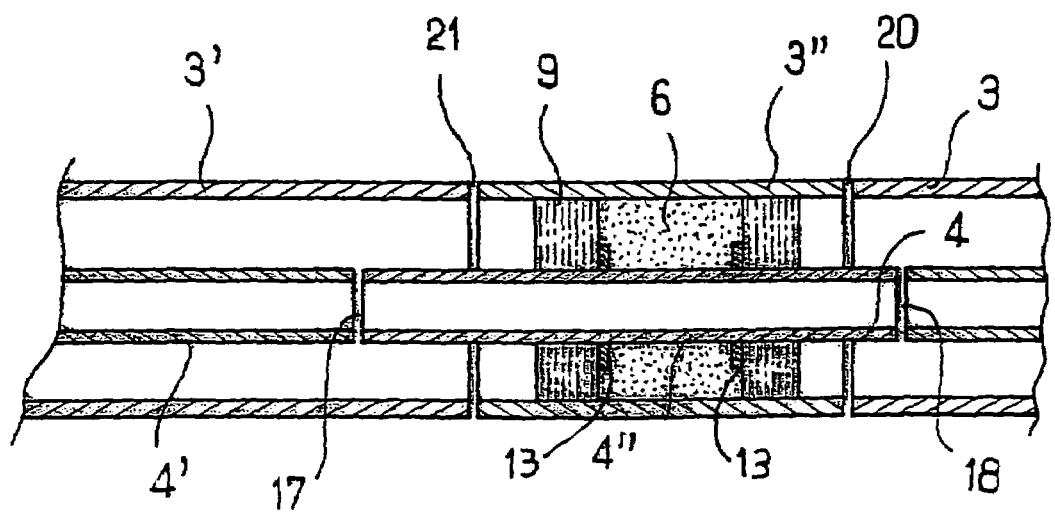
FIG_3

DEVICE FOR ARRESTING THE PROPAGATION OF A BUCKLE IN A DOUBLE-WALLED PIPE

CROSS-REFERENCE TO RELATED APPLICATION

This is a continuation of U.S. patent application Ser. No. 09/598,010, filed Jun. 20, 2000 now abandoned in the name of Antoine Bastard et al. entitled DEVICE FOR ARRESTING THE PROPAGATION OF A BUCKLE IN A DOUBLE-WALLED PIPE.

BACKGROUND OF THE INVENTION

The present invention relates to a device for arresting the propagation of a buckle in a double-walled pipe which can be wound onto a reel and more particularly in a rigid pipe used for transporting fluids such as hydrocarbons.

A rigid pipe or tube is laid on the seabed usually from a so-called pipelaying vessel. The laying is called S-laying when the pipe adopts the shape of an S between the pipelaying vessel and the seabed and it is called J-laying when the pipe adopts the shape of a J. In the latter case, a guide ramp is provided on the pipelaying vessel, which ramp may sometimes be partially immersed in the water.

The rigid pipe to be laid is stored on the pipelaying vessel either in pipe sections of a given but relatively short length, the pipe sections being joined together as the laying progresses, or it is wound as a great length on a reel, the pipe then being unreeled from the said reel during the laying operation. These laying operations are described in the API (American Petroleum Institute) document "Recommended Practice 17 A" from 1987.

When the pipe has left the vessel and while the pipe is being laid, it is important that the pipe undergoes no plastic deformation in bending, which would result in ovalization of the pipe, as ovalization causes a "singular weak point" which would be conducive to the initiation of a collapse. Moreover, when the pipe is laid on the seabed at great water depths (typically greater than 300 m and possibly up to 2000 m and more), the hydrostatic pressure exerted on the pipe may be sufficient to initiate a buckle which has a tendency to propagate along the pipe, in both directions. Of course, the buckle will form preferentially at a "singular weak point" when one exists on the pipe. When the buckle occurs, it is then necessary to replace at least that section or portion of the pipe comprising the buckled or collapsed region.

To prevent the propagation of a local buckle or buckles, it has been proposed to provide the pipe with certain devices or means, called buckle arrestors.

Such buckle arrestors are described in the U.S. Pat. Nos. 2,425,800, 3,747,356, 3,768,269 and 4,364,692.

The process in U.S. Pat. No. 3,747,356 consists in linking a cylinder to a cable, in lodging the cylinder inside a pipe section and then in simultaneously unreeling the pipe and the cable so as to keep the cylinder in the pipe section while the latter is being laid, until the pipe comes into contact with the seabed. The cylinder is then brought back up so as to be lodged in another pipe section to be laid, which is joined to the previous section. Consequently, any buckle likely to occur, when laying the pipe, between the pipelaying vessel and the seabed is immediately arrested and therefore not allowed to propagate along the pipe sections. However, such an arrangement provides no solution or effectiveness for arresting buckles likely to be propagated after the pipe has been finally laid on the seabed.

In U.S. Pat. No. 3,768,269, it is proposed to locally increase the stiffness of the pipe by placing, at regular intervals, for example at intervals ranging between 100 m and 500 m, reinforcing collars whose length ranges between 1 m and 2.5 m. Such a solution is valid only for pipes laid in sections since the reinforcing collars can be mounted and fastened in the factory to the pipe sections and then transported by the pipelaying vessel to the laying site. When the pipe is long and wound onto a storage reel, it then becomes virtually impossible to wind the pipe with its reinforcing collars onto a reel since they would result in straight or almost straight portions that cannot be deformed when winding the pipe onto the storage reel. In order to mitigate this difficulty, it is conceivable to mount and fasten the reinforcing collars during the laying operations. However, it would then be necessary to interrupt the laying, at regular intervals, so as to mount and fasten the reinforcing collars.

In order to allow the pipe to be wound onto a reel, U.S. Pat. No. 4,364,692 proposes to wind a rod tightly around the pipe so as to form a certain number of turns which can be welded at their ends to the rod itself and/or to the pipe.

According to another embodiment, the turns may be individual turns, by welding their two ends and regularly spacing them apart along that portion of the pipe to be reinforced. As long as the pipe is a single-walled pipe, the increase in the diameter in the reinforced portions may be acceptable. However, when the pipe is of the double-walled or pipe-in-pipe type, that is to say comprising an external pipe or carrier pipe which is slipped over the internal pipe, the increase in the diameter of the carrier pipe is unacceptable when transporting and storing long lengths of pipe of the pipe-in-pipe type.

When the rigid pipe to be laid is manufactured in long lengths on land and then wound onto a reel on the pipelaying vessel, the solutions recommended in the aforementioned documents are not appropriate as they use either long reinforcing collars, having a length of about 1 to 2.5 m, as in U.S. Pat. No. 3,768,269, or the winding of a reinforcing rod around the rigid pipe, as in U.S. Pat. No. 4,364,692.

Another propagation arrestor is described in U.S. Pat. No. 3,860,039 and consists in placing a sleeve over a rigid pipe so as to have a constant outside diameter with a liner. The annular space between the sleeve and the pipe is filled with tar, which transfers the collapse force to the sleeve.

Other end-blocking systems, or bulkheads for double-walled rigid pipes exist and are described especially in WO 96/36831 and WO 98/17940. Such bulkheads cannot be likened to propagation arrestors since the material from which they are produced is not capable of transferring the stresses applied to the carrier pipe on the internal pipe.

SUMMARY OF THE INVENTION

The object of the present invention is to provide a method of producing a device for arresting the propagation of a buckle in a double-walled tube or pipe that can be wound onto a reel placed on a pipelaying vessel or equivalent system, such as a barge, a floating platform, etc.

The subject of the present invention is a method of producing a device for arresting the propagation of a buckle in a rigid pipe comprising an outer wall having a defined external diameter and placed around an inner wall, an annular space being provided between the outer and inner walls, which method is characterized in that it consists in providing predetermined regions in the annular space, each predetermined region being bounded between two sealing blocks whose radially opposed faces are in contact with the outer and inner pipes, and in placing a curable compound in each predetermined region, the length of each predetermined region being at least equal to 0.5 times the external diameter of the outer wall.

An advantage of the present invention resides in the fact that the curable compound may be introduced into the annular space of the rigid pipe on land and cured, since the length of each predetermined region which is filled with the cured compound is short enough to allow the rigid pipe to be wound, onto a reel for example. The length dimension is regarded as being axial, that is to say in the longitudinal direction of the rigid pipe, as opposed to the radial dimensions, such as the separation between the external surface of the internal wall and the internal surface of the external wall, the separation defining the annular space provided between the internal and external walls.

Depending on the nature of the curable compound used, a one-component or two-component compound, the curing time may be long or short according to the requirements. It is possible to select a resin and a hardener which are such that the curing of the curable compound is complete in a predetermined region before the same compound is introduced into another predetermined region.

Another advantage is that the buckle propagation arrestor is very simple to produce and does not require substantial means and that the curable compounds that can be used are sufficiently numerous to allow the best choice, which depends especially on the desired curing time.

Another advantage is that the number of predetermined regions filled with curable compound may be relatively large without creating any impediment to the winding of the rigid pipe onto the receiving reel or reels.

Another advantage is that the curable compound constitutes, by its nature, a good thermal insulation at the predetermined regions.

According to another characteristic of the invention, the sealing blocks each consist of a radially deformable material which may consist, in one embodiment, of a set of components that can deform individually in the radial direction, each component being able, for example, to have the shape of a washer or of a chevron.

Another advantage is that the at least radial deformation of each sealing block allows it to match the various local irregularities in the internal surface of the outer wall and therefore to adapt to the manufacturing tolerances on the outer wall.

According to another characteristic of the invention, the sealing blocks bear via one of their lateral faces on a bearing plate which is, for example, welded to the external surface of the internal wall, a gap being provided between the free edge of the bearing plate and the internal surface of the outer wall. Consequently, after installation of the sealing blocks, introduction of the curable compound between two consecutive bearing plates, which thus define a predetermined region filled with the curable compound, and then radial deformation of the sealing blocks, a seal is also produced which seals against water or another liquid should either water or another liquid get into the annular space. This is because the curable compound, after it has cured, fills the gap by pressing against the expanded blocks.

Another advantage resides in the fact that the curable compound may be injected into the rigid pipe either on land, when the pot life is long enough for the curing not to take place before use on the operating site, or directly on the pipelaying ship, activation means being provided on the pipelaying vessel in order to allow complete or partial curing of the curable compound.

BRIEF DESCRIPTION OF THE DRAWINGS

Further advantages and features will become more clearly apparent on reading the description of several embodiments of the invention, as well as from the appended drawings in which:

FIG. 2 is a schematic view of the joining of sections of the rigid pipe with two welds;

FIG. 3 is another schematic view of the joining of sections of the rigid pipe with four welds;

DESCRIPTION OF PREFERRED EMBODIMENTS

Figure 1:
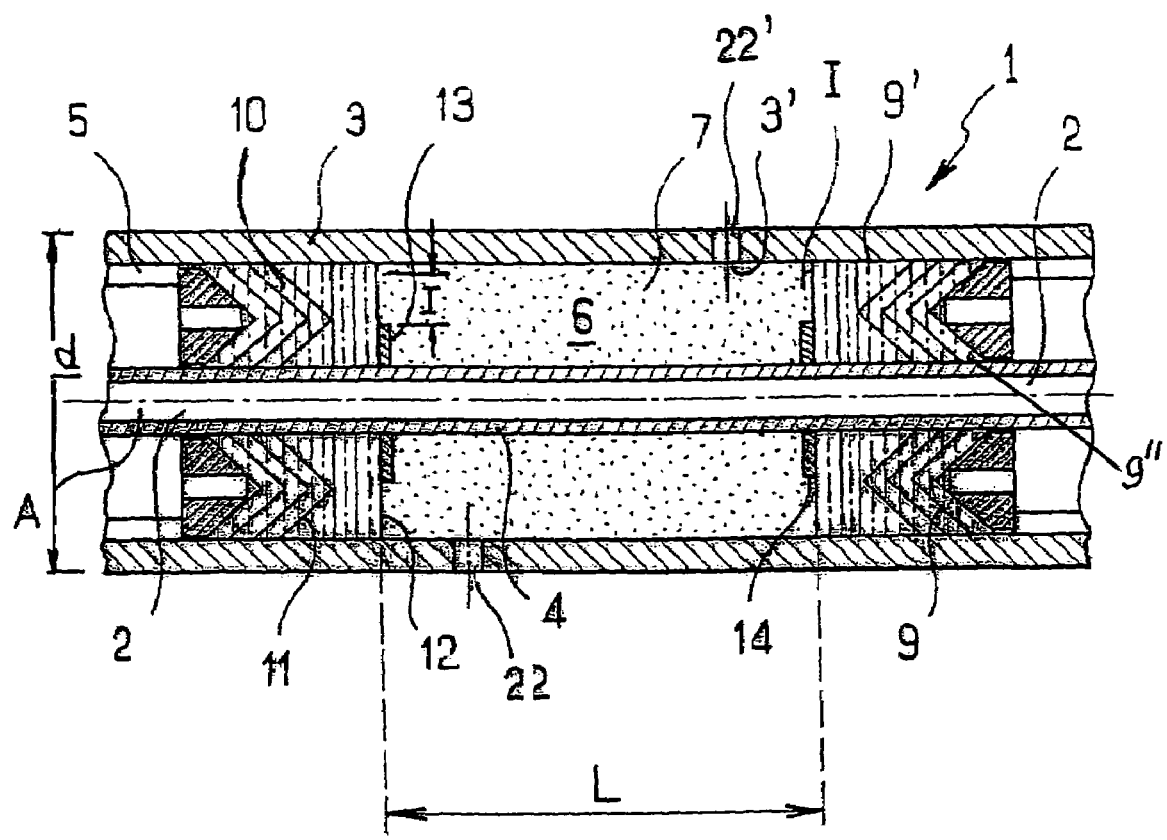
FIG. 1 is a cross-sectional view of a portion of a section of a double-walled rigid pipe.

The double-walled rigid pipe 1 of longitudinal axis A, shown partially in FIG. 1, comprises an inner wall or inner pipe 2 (flow pipe), the diameter and the nature of the material of which are chosen according to the fluid flowing in the said inner pipe, especially depending on the temperature and pressure of the fluid, and an outer wall or outer pipe 3 (carrier pipe) which is slipped over the inner pipe 2. The outer pipe 3 generally has an outside diameter D which is oversized with respect to the inner pipe 2 in order to allow a thermal insulation to be placed in the annular space 5 and represents a thickness allowing the hydrostatic pressure that is exerted on the said outer pipe 3 to be withstood. The rigid pipe 1 generally includes spacers or separators (not shown) which are fastened to the external surface 4 of the inner pipe 2 and which are lodged in the annular space 5 provided between the outer pipe 3 and the inner pipe 2.

According to the invention, a curable compound 6 is placed in predetermined regions 7 of the rigid pipe 1. Each predetermined region 7 has a given axial length L, which region is, for example, bounded by two sealing blocks 9 which are each in sealed and tight contact via their radially opposed faces 9', 9" with the internal surface 3' and external surface 4 of the pipes 3 and 2, respectively. The axial length L of each predetermined region 7, between two consecutive sealing blocks, is at least equal to 0.5 times the outside diameter D of the outer pipe 3 and it preferably ranges between 0.5 times and twice the said diameter D, when the compound is cured on land and before winding onto a reel on the pipelaying vessel. The calculations and tests carried out with various types of curable compounds 6 have shown that a length L lying within the limits indicated above was satisfactory; preferably, the upper limit is equal to the diameter D. In fact, the length L depends also and especially on the operating conditions of the rigid pipe 1. It is obvious that when the rigid pipe is very long, there will be many predetermined regions 7. Likewise, when the operating conditions are such that the depth of the sea between the pipelaying vessel and the seabed is great, it will be necessary to define the number and the length of the predetermined regions 7 so as to prevent propagation of a buckle, should it occur, even after a portion of the rigid pipe has been finally laid on the seabed.

In a preferred embodiment of the invention, each sealing block 9 is made of one or more radially deformable materials, as will be explained in detail below. Radially deformable sealing blocks 9 have several advantages. A first advantage is that they each have a radial dimension, between the opposed faces 9' and 9", which is less than the inside diameter d of the outer pipe 3 so that, after deformation, the radially opposed faces 9' and 9', are in sealed and tight contact with the internal surface 3' and the external surface 4. In addition, the tight contacting with the internal surface 3' makes it possible to absorb any surface irregularities that the internal surface 3' might have, these being due especially to the manufacturing tolerances on the outer pipe 3.

Each block 9 may consist of a set of individually deformable components 10 which are placed in the form of a stack in the axial direction A, or are imbricated in one another, for example, when each component 10 is in the form of a chevron 11, the tip of the chevrons are directed in the direction A.

In another embodiment, also shown in FIG. 1, each block 9 bears, via one of its lateral faces 12, against a bearing plate 13 whose radial dimension or radius measured from the longitudinal axis A is less than the internal radius of the outer pipe 3, so that a gap I is left between the free edge 14 of the bearing plate 13 and the internal surface 3' of the outer pipe 3, the internal radial face of each bearing plate 13 being welded to the external surface 4 of the inner pipe 2.

According to a first way of implementing the method according to the invention, shown in FIG. 2, a section of inner pipe 2 is taken and the sealing block furthest to the right and, if necessary, the bearing plates 13 are positioned, as are the various components which have to be lodged in the annular space 5, such as the spacers, the thermal insulation, etc. Next, a section of outer pipe 3 is slipped over the inner pipe 2 so that that region of the inner pipe where the sealing blocks are located is covered last, the section of outer pipe being slipped in the opposite direction so as not to damage the sealing blocks.

In another step, the internal pipes of two sections of double-walled pipe are welded together and then the section of outer pipe is slid along until it comes into contact with the other section of outer pipe and the two sections are welded together. The welds between the inner and outer pipes are depicted by the reference numbers 16 and 15, respectively; thus, a two-weld method is employed.

In another step, the internal block or the one furthest to the right in FIG. 1 is radially deformed and the other sealing block 9 furthest to the left is positioned; the curable compound is then introduced or injected in a sufficient amount into the predetermined region 7 and the sealing block furthest to the left is radially deformed.

FIG. 3 shows a four-weld method. After having taken a section of internal pipe 2 and welded two bearing plates 13 separated by a given distance, a section of outer pipe 3 shorter than the section of internal pipe is slipped on. An expandable block 9 is introduced via one end of the short section of outer pipe, this expandable block then being compressed axially in order to produce a radial deformation and therefore a tight contact with the internal surface of the short section of pipe. Next, the desired amount of curable compound is introduced and then the second block 9 is introduced via the other end of the short section of pipe, and the said second block is deformed radially. The welding steps will consist in welding the section of internal pipe to the other two sections, the two welds being depicted by the regions or gaps 18 and 19, and then in welding the short section of outer pipe to the other two longer sections of outer pipe, the two welds being depicted by the reference numbers 20 and 21.

In some cases, the curable compound may include air, a situation which is not desirable because of the weakening of the buckle arrestor device 1 that it may cause. It is possible to expel the air from the curable compound if bearing plates are not used and if the curable compound is compressed by means of the blocks 9, the air expelled during compression being removed via the interstice or vent that exists between the upper face of at least one block and the internal surface of the outer pipe, while the blocks in the rest state are undeformed. After deformation, a complete seal is obtained which even seals against water or against any other liquid which might get into the annular space.

Another way of implementing the method according to the invention consists in providing, in line with each predetermined region 7, at least one orifice 22 through which the curable compound 6 is injected under pressure into the predetermined region 7. After the latter has been filled, the orifice or orifices 22 are sealed off. Under these conditions, the curable compound 6, which is free of air, is introduced into the gaps I left between the free edge 14 of the bearing plates 13 and the internal surface 3' and comes into contact with the sealing blocks which are in the undeformed state. After the curable compound has cured, an excellent seal with respect to any foreign body, solid or fluid, which might flow in the annular space 5 is also obtained. Preferably, two orifices 22 and 22' are provided in each predetermined region 7, the orifice 22 being provided in the bottom and the orifice 22' in the top. The curable compound is injected under pressure into the predetermined region 7 until a small quantity of it runs out via the radially opposed orifice 22'. After the predetermined region 7 has been completely filled, the orifices 22 and 22' are then sealed off.

Although it is possible to use as curable compound a one-component compound whose pot life is relatively long, it is preferable to use a two-component compound, the resin and the hardener of which are mixed in a filling head before it is introduced into the predetermined regions 7 and the pot life of which, at room temperature, is a few minutes. Among one-component compounds, mention may be made of MS 703-25 from Engineering Materials Systems Inc. Among two-component compounds that can be used, mention may be made by way of example of ARALDITE 2012 (AW 2104/HW 2934) sold by Ciba-Geigy. The curing time may be adjusted by varying the temperature at which the mixture is injected into each predetermined region 7.

Figure 4:
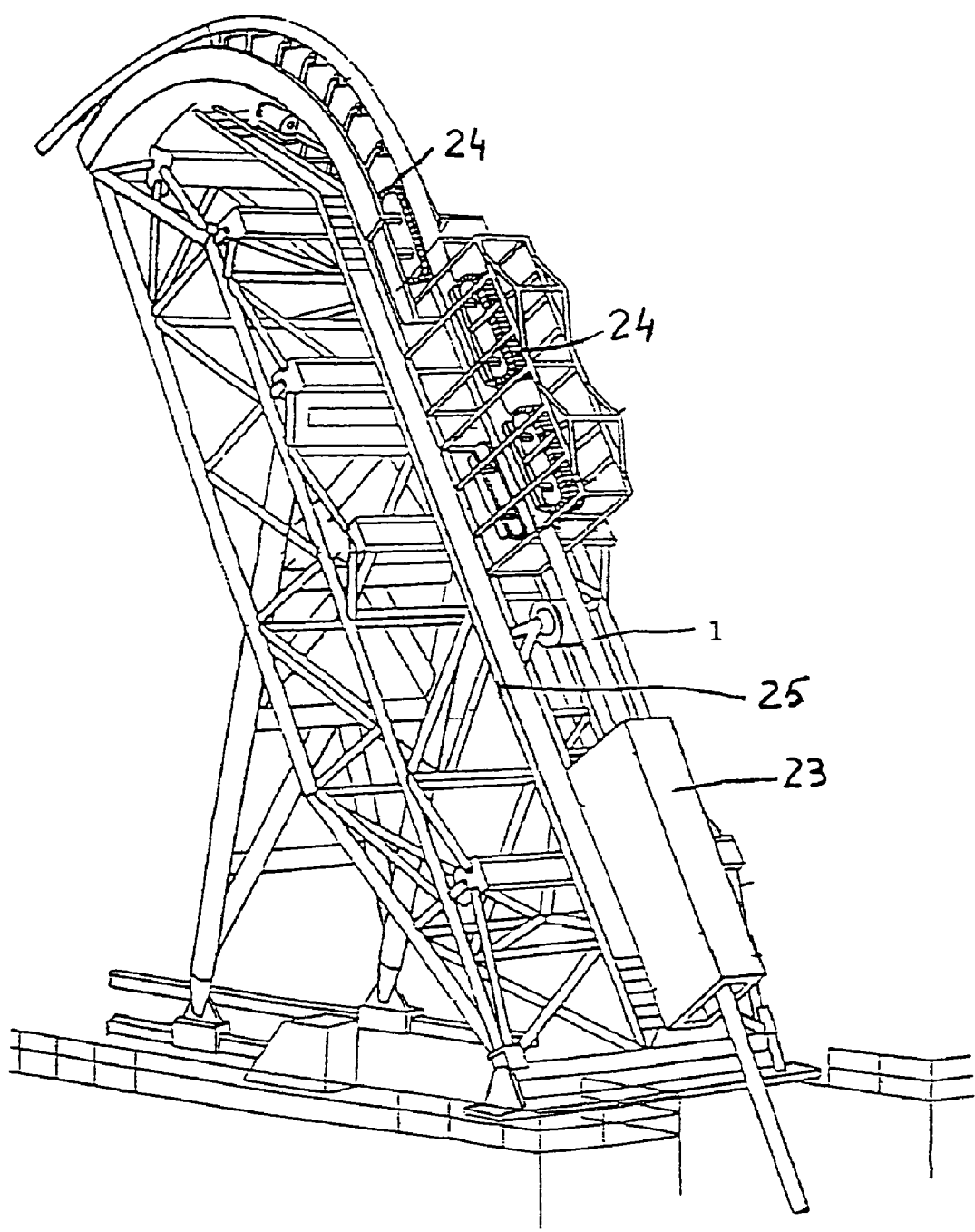
FIG. 4 is a perspective view of part of the means with which the pipelaying vessel is equipped, these being used in one particular implementation of the method according to the invention.

In another embodiment, the rigid pipe 1 is transported, wound up on the operating site with the predetermined regions 7 empty or devoid of any curable compound. On the operating site, the predetermined regions 7 of the rigid pipe are filled with a one-component compound having a short pot life, of a few minutes to a few hours, and, in order to accelerate the curing, heating means, as shown in FIG. 4, may be used. The filling of the predetermined regions 7 may be carried out either after the rigid pipe 1 has been unreeled from the receiving reel but before it has passed through straighteners 24 which are provided along the path of the rigid pipe, when the reaction time of the components of the compound is long enough, or after the straighteners 24. When the two components of the compound react together rapidly, in order to allow the compound to cure, it is not necessary to use additional means to obtain the desired curing unless it is wished to accelerate the curing. When it is necessary or desirable to accelerate the curing, so as to reduce the stoppage time when laying the rigid pipe, heating means 23 may be provided on the path along which the rigid pipe runs between the straighteners and the heating means 23 so that the curing has taken place at least partially before the rigid pipe leaves the pipelaying vessel. In a preferred embodiment of the invention, the heating means 23 are provided near the bottom end of a pipelaying ramp 25 mounted on the pipelaying vessel and the predetermined regions 7 are filled after they have passed through the straighteners 24, while the rigid pipe is straight. The two-component compound used, which is a thermosetting compound, may consist of ARALDITE AY 105-1/HY 991 sold by Ciba-Geigy.

A compound not requiring heating means may consist of ARALDITE 2012 (AW 2104/HW2934) sold by Ciba-Geigy.

Advantageously, if the curable compound is not rigid enough in the cured state, it is possible to insert, during manufacture of the rigid pipe 1, a reinforcement in one or more of the regions 7. The reinforcement may consist of fibers, fabrics or mats, a spring placed around the inner pipe 2, a metal mesh, etc. Consequently, the region or regions 7 will be filled with a composite consisting of the reinforcement and the curable compound.

It is also possible to use a one-component curable compound whose pot life is relatively long, for example of the order of a few weeks. Such a curable compound may be injected into the predetermined regions 7 on land, during manufacture of the rigid pipe 1, the latter then being transported to the pipelaying vessel where it is wound onto one or more receiving reels. Since the curable compound is in the uncrosslinked state, it is flexible, which allows the rigid pipe to be wound onto the receiving reel or reels until the pipelaying vessel reaches the operating site.

It is then necessary to cure the compound before the rigid pipe is immersed in the water. In this case, in a laying step after the rigid pipe has been unreeled from the reel onto which it was wound, the rigid pipe 1 goes past or through appropriate means for activating and curing the compound injected into each predetermined region 7. The appropriate means may consist, for example, of suitable well-known heating means which initiate the crosslinking or curing of the one-component compound. The one-component compound is cured in a place where the rigid pipe is linear and when the rigid pipe leaves the pipelaying vessel to be immersed in the water.

We claim:

1. A method of manufacturing a reelable double-walled rigid pipe for underwater transportation of fluids, wherein the pipe comprises an inner flow pipe, the interior of which defines a passage for transporting the fluid, an outer carrier pipe which surrounds the flow pipe, and a plurality of longitudinally spaced separating elements between the inner and outer pipes which define an annular space therebetween, the method comprising:

selecting dimensions and properties of the inner pipe and the carrier pipe according to an intended fluid transportation application, and an intended pipeline location, and to have suitable mechanical properties which permit the double walled pipe to be plastically deformed for reeling on a vessel reel and then straightened while being laid offshore;

assembling a double walled pipe using the selected carrier and flow pipes, and the separating elements; and forming a device within the double-walled pipe for arresting longitudinal propagation of buckling of the outer carrier pipe, by:

placing at least one pair of sealing blocks axially spaced apart between the outer wall of the flow pipe and the inner wall of the carrier pipe;

the sealing blocks having a first circumferentially extending face and a second radially opposite face, the faces being dimensioned to be in contact respectively with the outer and inner walls of the flow pipe and the carrier pipe, to define a sealed annular region within the annular space;

spacing the sealing blocks so that the axial length of the annular region is at least equal to 0.5 times the external diameter of the carrier pipe, but occupies substantially less than the entire annular space;

placing a curable compound in the annular region;

curing the compound in the annular region; and winding the pipe on a reel after placing and curing the compound.

2. The method of claim 1, wherein the axial length of the annular region is in the range of 0.5 to 2 times the external diameter of the carrier pipe.

3. The method of claim 1, further comprising installing a rigid bearing plate to bear against at least one lateral side of each of the sealing blocks.

4. The method of claim 3, wherein the bearing plate has a radial dimension that is less than the radial dimension of the annular space.

5. The method of claim 4, wherein:

the bearing plate is fastened to the outer wall of the flow pipe, the bearing plate has a radially outer free edge and is so dimensioned as to define a gap between the free edge of the bearing plate and the inner wall of the carrier pipe.

6. The method of claim 5, wherein the bearing plate is made of metal.

7. The method of claim 1, wherein the curable compound is an epoxy resin.

8. The method of claim 1, further including the steps of:

providing an injection orifice through the wall of the carrier pipe into the annular region; and injecting the curable compound into the annular region through the orifice.

9. The method of claim 8, wherein the curable compound is a thermosetting compound.

10. The method of claim 8, wherein the curable compound is curable at room temperature.

11. The method of claim 1, further comprising the steps of:

reeling the rigid pipe onto a reel after assembly but before placing the curable compound in the annular region;

unreeling the rigid pipe from the reel, placing the curable compound the annular region after the pipe has been unreeled, and heating the annular region to accelerate the curing of the curable compound.

12. The method of claim 11, wherein the annular region is heated by passing it through a heater.

13. The method of claim 12, further comprising the step of straightening the pipe before heating the annular region to cure the compound.

14. The method of claim 13, wherein:

the pipe is straightened in straighteners in a pipe laying vessel; and the annular region of the pipe is heated in a heater mounted after the straightener on the vessel along the path of movement of the pipe: and further including the step of moving the pipe from the reel through the straighteners and past the heater.

15. The method of claim 13, wherein the curable compound is placed in the annular region after the pipe has been straightened.

16. The method of claim 1, wherein the curable compound has a pot life in the range of a few minutes to a few weeks.

17. A method of claim 1, wherein the step of assembling the double walled pipe further comprises including therein a plurality of pairs of axially spaced sealing blocks, thereby defining a plurality of annular regions, the totality of the axial lengths of the plurality of annular regions occupying substantially less than the entire annular space.

18. A method of manufacturing a reelable double-walled rigid pipe for underwater transportation of fluids, wherein the pipe comprises an inner flow pipe, the interior of which defines a passage for transporting the fluid, an outer carrier pipe which surrounds the flow pipe, and a plurality of longitudinally spaced separating elements between the inner and outer pipes which define an annular space therebetween, the method comprising:

selecting dimensions and properties of the inner pipe and the carrier pipe according to an intended fluid transportation application, and an intended pipeline location, and to have suitable mechanical properties which permit the double walled pipe to be plastically deformed for reeling on a vessel reel and then straightened while being laid offshore;

assembling a double walled pipe using the selected carrier and flow pipes, and the separating elements; and forming a device within the double-walled pipe for arresting longitudinal propagation of buckling of the outer carrier pipe, by:

placing at least one pair of sealing blocks axially spaced apart between the outer wall of the flow pipe and the inner wall of the carrier pipe;

wherein each of the sealing blocks is comprised of a material which is radially deformable when compressed axially and axially compressing the sealing blocks to conform the radially outer margins thereof to the shape of the respective inner and outer walls of the carrier pipe and the flow pipe;

the sealing blocks having a first circumferentially extending face and a second radially opposite face, the faces being dimensioned to be in contact respectively with the outer and inner walls of the flow pipe and the carrier pipe, to define a sealed annular region within the annular space; installing a rigid bearing plate to bear against at least one lateral side of each of the sealing blocks, fastening the bearing plate to the outer wall of the flow pipe, wherein the bearing plate has a radial dimension that is less than the radial dimension of the annular space, the bearing plate has a radially outer free edge and is so dimensioned as to define a gap between the free edge of the bearing plate and the inner wall of the carrier pipe;

spacing the sealing blocks so that the axial length of the annular region is at least equal to 0.5 times the external diameter of the carrier pipe, but occupies substantially less than the entire annular space;

placing a curable compound in the annular region; and curing the compound in the annular region.

19. A method of manufacturing a reelable double-walled rigid pipe for underwater transportation of fluids, wherein the pipe comprises an inner flow pipe, the interior of which defines a passage for transporting the fluid, an outer carrier pipe which surrounds the flow pipe, and a plurality of longitudinally spaced separating elements between the inner and outer pipes which define an annular space therebetween, the method comprising:

selecting dimensions and properties of the inner pipe and the carrier pipe according to an intended fluid transportation application, and an intended pipeline location, and to have suitable mechanical properties which permit the double walled pipe to be plastically deformed for reeling on a vessel reel and then straightened while being laid offshore;

assembling a double walled pipe using the selected carrier and flow pipes, and the separating elements; and forming a device within the double-walled pipe for arresting longitudinal propagation of buckling of the outer carrier pipe, by:

placing at least one pair of sealing blocks axially spaced apart between the outer wall of the flow pipe and the inner wall of the carrier pipe, wherein each of the sealing blocks is comprised of a material which is radially deformable when compressed axially, and axially compressing the sealing blocks to conform the radially outer margins thereof to the shape of the respective inner and outer walls of the carrier pipe and the flow pipe, the sealing blocks having a first circumferentially extending face and a second radially opposite face, the faces being dimensioned to be in contact respectively with the outer and inner walls of the flow pipe and the carrier pipe, to define a sealed annular region within the annular space;

spacing the sealing blocks so that the axial length of the annular region is at least equal to 0.5 times the external diameter of the carrier pipe, but occupies substantially less than the entire annular space;

at the time of assembly, each sealing block has a radial dimension less than the radial dimension of the annular space; and subsequent to assembly, further including the step of radially expanding the sealing block to bring its radially opposite faces into tight contact with the outer wall of the flow pipe and the inner wall of the carrier pipe;

placing a curable compound in the annular region; and curing the compound in the annular region.

20. A method of manufacturing a reelable double-walled rigid pipe for underwater transportation of fluids, wherein the pipe comprises an inner flow pipe, the interior of which defines a passage for transporting the fluid, an outer carrier pipe which surrounds the flow pipe, and a plurality of longitudinally spaced separating elements between the inner and outer pipes which define an annular space therebetween, the method comprising:

selecting dimensions and properties of the inner pipe and the carrier pipe according to an intended fluid transportation application, and an intended pipeline location, and to have suitable mechanical properties which permit the double walled pipe to be plastically deformed for reeling on a vessel reel and then straightened while being laid offshore;

assembling a double walled pipe using the selected carrier and flow pipes, and the separating elements; and forming a device within the double-walled pipe for arresting longitudinal propagation of buckling of the outer carrier pipe, by:

placing at least one pair of sealing blocks axially spaced apart between the outer wall of the flow pipe and the inner wall of the carrier pipe;

the sealing blocks having a first circumferentially extending face and a second radially opposite face, the faces being dimensioned to be in contact respectively with the outer and inner walls of the flow pipe and the carrier pipe, to define a sealed annular region within the annular space;

spacing the sealing blocks so that the axial length of the annular region is at least equal to 0.5 times the external diameter of the carrier pipe, but occupies substantially less than the entire annular space;

placing a curable compound in the annular region; and curing the compound in the annular region;

winding the pipe onto a receiving reel after placing the curable compound in the annular region;

transporting the reel carrying the pipe to a site for use of the pipe, and unwinding the wound pipe from the reel at the site for use.

21. The method of claim 20, wherein;

the curable compound is introduced into the annular region while the pipe is on land, the receiving reel is located on a pipe-laying vessel, and the wound reel is transported on the vessel to the site for laying of the pipe.

* * * * *